United States Patent [19]
Lin

[11] Patent Number: 5,997,738
[45] Date of Patent: Dec. 7, 1999

[54] REVERSE OSMOSIS WATER FOUNTAIN MACHINE WITH WATER SAVING DEVICE

[76] Inventor: Shang-Chun Lin, 1st Floor, No. 1, Alley 35, Lane 11, Sec. 5, Fu-An Rd., An-Nan Dist., Tainan, Taiwan

[21] Appl. No.: 09/039,326

[22] Filed: Mar. 16, 1998

[51] Int. Cl.⁶ .................................................. C02F 9/00
[52] U.S. Cl. ................. 210/195.1; 210/102; 210/109; 210/134; 210/195.2; 210/257.1; 210/257.2; 210/258; 210/259; 210/260; 210/416.1; 210/416.3
[58] Field of Search .............................. 210/102, 99, 109, 210/134, 136, 137, 436, 195.1, 195.2, 257.1, 257.2, 258, 259, 260, 416.1, 416.3

[56] References Cited

U.S. PATENT DOCUMENTS 4,626,346 12/1986 Hall .
5,639,374 6/1997 Monroe et al. .
5,725,758 3/1998 Chace et al. .
5,817,231 10/1998 Souza .

Primary Examiner—W. L. Walker
Assistant Examiner—Michael Fleming
Attorney, Agent, or Firm—Rosenberg, Klein & Lee

[57] ABSTRACT

A water saving device for a reverse osmosis water fountain machine is provided in which an aspirating pipe with a solenoid valve is coupled to an intake pipe line at the front end of the reverse osmosis cylinder. Before that joint, another solenoid valve is connected to the intake pipe line. The rear end of the aspirating pipe extends into a reservoir. A solenoid valve is connected to a drain pipe line of the reverse osmosis cylinder, and extends into an input pipe of a reservoir. All of the solenoid valves are controlled by a central processing unit to change the working state of the water purification system. One such operating state is the recycling of the waste water from the reverse osmosis cylinder, thereby reducing the amount of waste water produced.

1 Claim, 6 Drawing Sheets

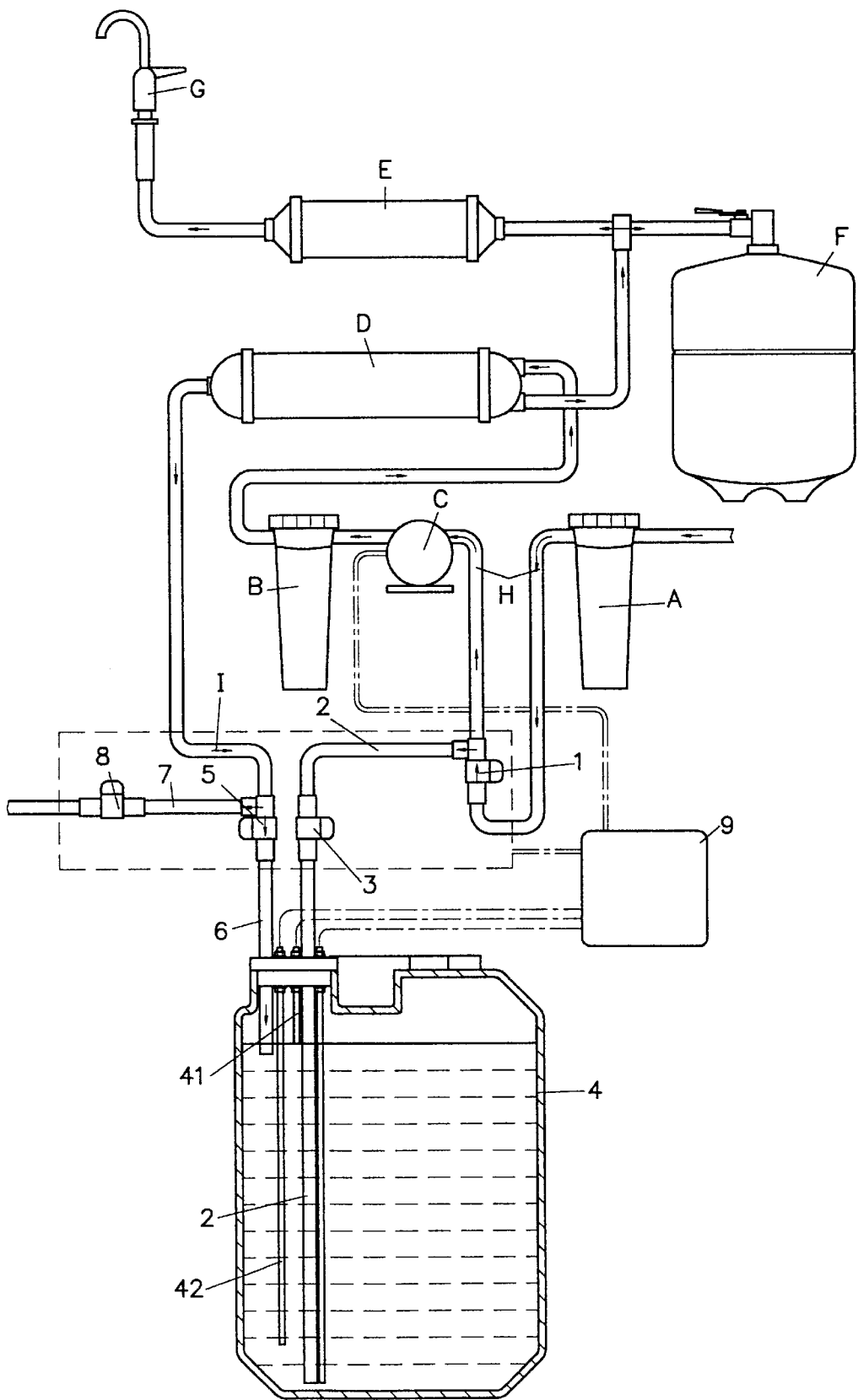
F I G . 2

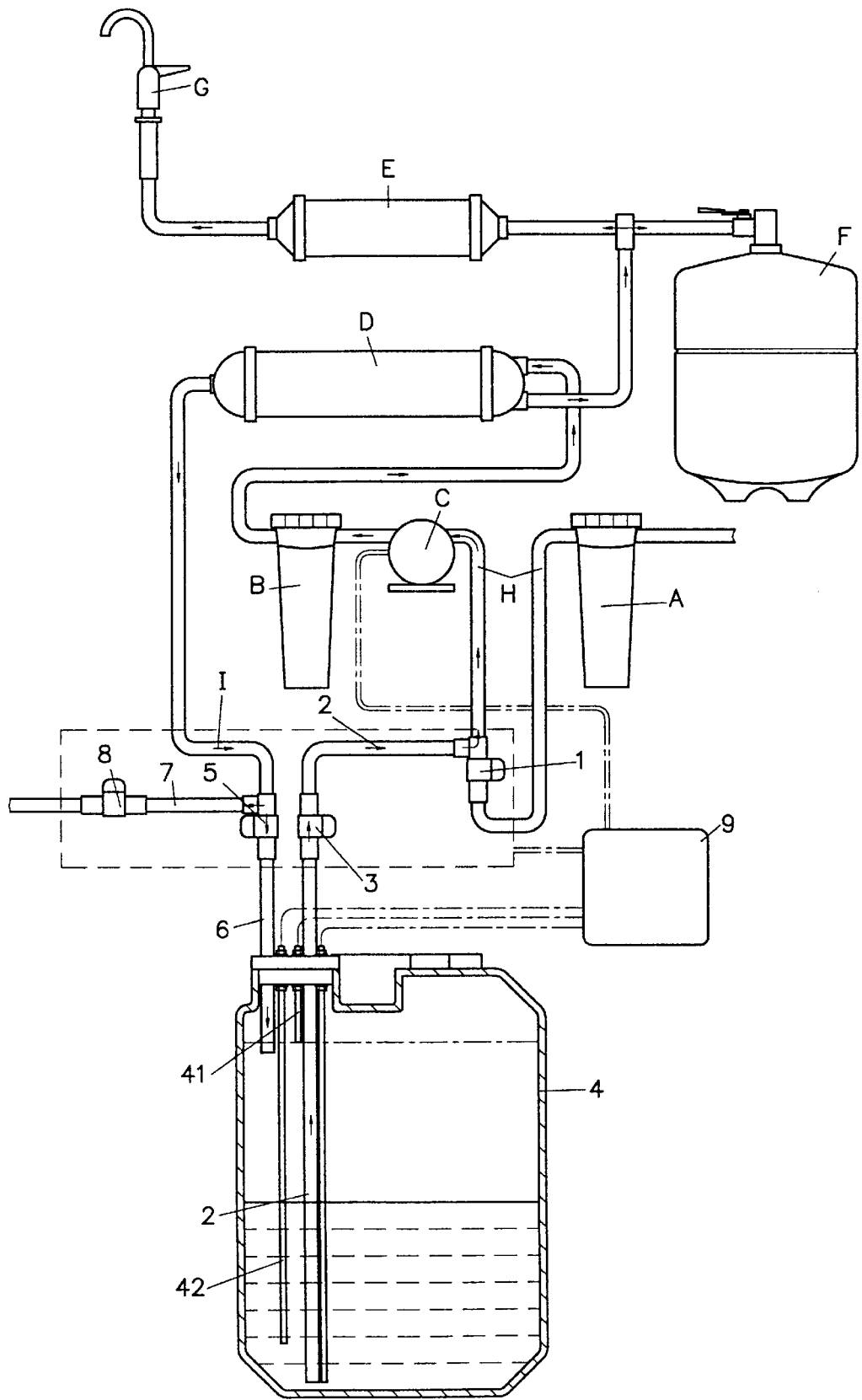
F I G . 3

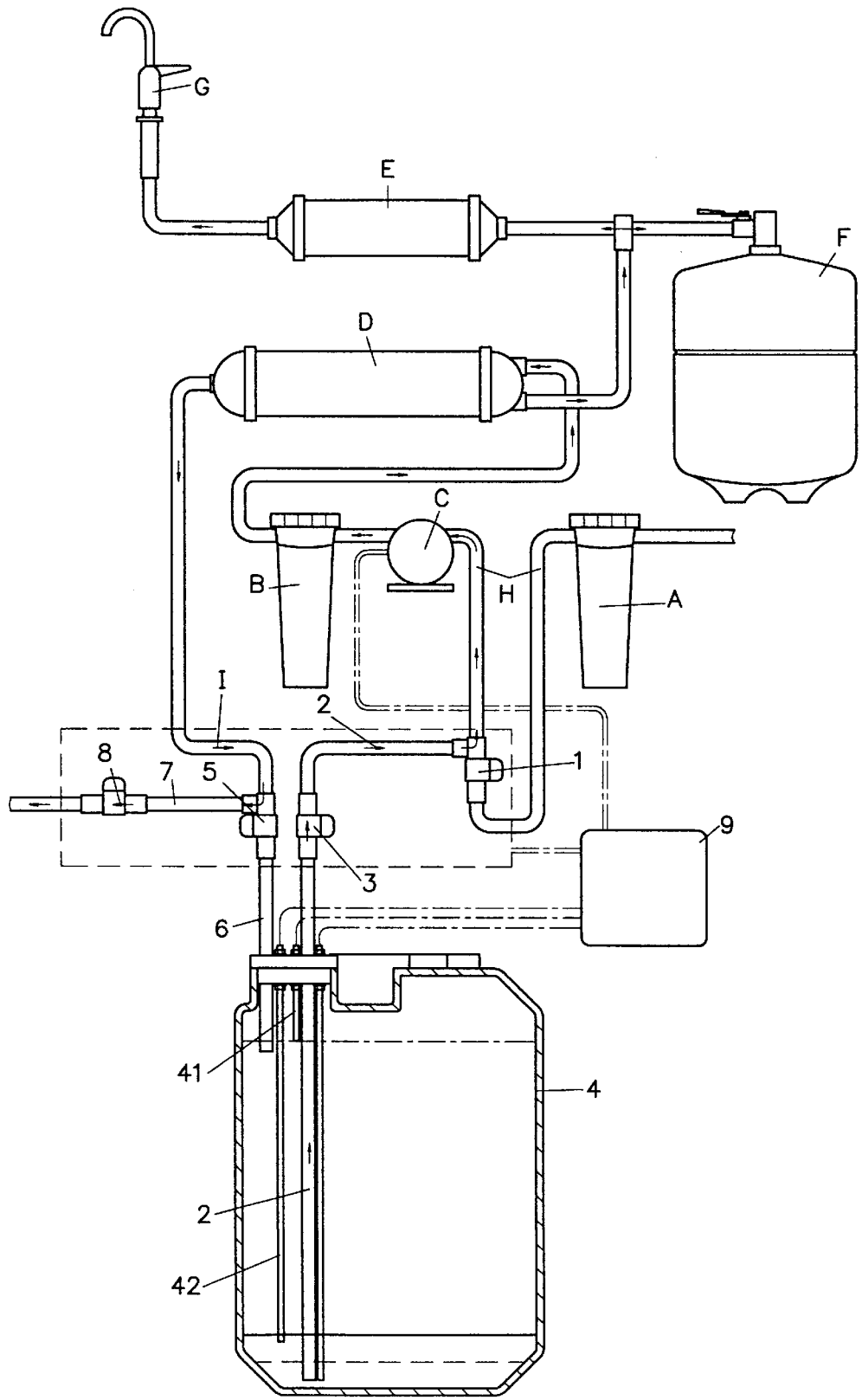
F I G . 4

REVERSE OSMOSIS WATER FOUNTAIN MACHINE WITH WATER SAVING DEVICE

BACKGROUND OF THE INVENTION

1. Field of the Invention

The present invention relates to a water saving device for a reverse osmosis water fountain machine, and more particularly to a water saving device attached on the drain pipe of a reverse osmosis water fountain machine so that the waste water drained out can be recycled for saving water resources and reducing waste.

2. Prior Art

Water from a water pipe contains a small quantity of pollutants, so that drinking the water over a long time period can result in some diseases. Hence, drinking water purification is very indispensable. Purifying drinking water has become an important matter. The methods traditionally taken include reverse osmosis, ion-exchange, distillation, activated carbon filter, sedimentation-type filter, boiling, ozone sterilization and ultraviolet ray sterilization, etc. Among them, reverse osmosis is the most popular because that method can obtain the cleanest water.

The conventional revers osmosis water fountain machine, as shown in FIG. 6, comprises two cartridge filters A and B, a pump C, a reverse osmosis cylinder D, an activated carbon filter cylinder E, a water tank F and a faucet G, cooperating with some pipes connecting them into system to process raw water with four purifying treatments in order to obtain the cleanest drinking water. The treating procedures includes:

1. pre-treatment: in the first cartridge filter A, the strainer core with 5 (micrometer) meshes inside will filter the macro-crystalline impurity substance for prolonging the service life of the reverse osmosis membrane;
2. mid-treatment: the activated carbon filter B filters the impurity substance further, and prolongs the service life of the reverse osmosis cylinder;
3. reverse osmosis treatment: in the reverse osmosis cylinder D, the semi-permeable membrane (special-cellular membrane) filters the micro-crystalline impurity substance to obtain cleaned and purified water to be drained into the water tank F for drinking;
4. post-treatment: by means of the activated carbon filter cylinder E, the pure water is treated by high-attenuating compressed granular activated carbon, so that the treated water can be drained to the faucet G for drinking.

Taking advantage of the above-mentioned purification system, a high-purity drinking water is available. But, we find that a great deal of waste water is drained from the reverse osmosis cylinder D, causing a tremendous waste. As an example, to obtain one glass of pure drinking water, five glasses of raw water are required for processing, with four glasses of water becoming waste water. Take for instance that one person should drink 8 glasses of water (500 CC) in one day, with respect to the above-mentioned purification system, 16 kg of water is generated in a day. We can find a proliferation of poor purification systems that waste a large amount of water. Today, the preservation of water resources is desired, and methods for using the ⅘ glasses of drained water, to achieve a high purification level, has become a vital task. With more than 500,000 reverse osmosis fountain machines, and the number is increasing rapidly, the quantity of the waste water will exceed that of the storage of the sum of two large reservoirs, per year. Furthermore, according to the World Bank, the twenty-first century will be "The war of Water", indicating that lack of water resources are critical. Therefore, the World Bank is urging Countries to conserve water efficiently. The most sophisticated and popular technical method of processing drinking water is reverse osmosis (RO). The shortcoming of reverse osmosis is that in order to obtain high quality drinking water, a large quantity of water will be wasted which could otherwise ease the drought situation in many areas of the world.

OBJECTS AND SUMMARY OF THE INVENTION

It is therefore a main object of the present invention to provide a water saving reverse osmosis filtered water fountain machine with a high-purification level, in which the waste water can be fed back again and again for multiple purification circulations to generate more pure water and reduce the waste.

This object is achieved by a water saving system bridged between the drain pipe and the input pipe with solenoid valves respectively. The water saver includes a reservoir having an aspirating pipe, an input pipe, and a pair of upper and lower limit water level gauge fingers installed therein. Wherein the aspirating pipe joins the intake pipe line of the reverse osmosis water fountain machine through a solenoid valve. Before that junction point, another solenoid valve is connected to the intake pipe line. The input pipe joins with the drain pipe line of the RO cylinder with a solenoid valve. Another solenoid valve is connected in tandem with the drain pipe. All the solenoid valves are controlled to act by a central processing unit to control the working states of the various pipe lines. In use, the first step is to lead in the running water from the faucet, to purify the pure water (⅕ of the intake water) from the intake water, and the waste water (⅘ of the intake water) is drained out from the drain pipe to be guided into the reservoir via the input pipe, until it gets to the upper water level limit. A pulse signal is sent into the central processing unit to trigger the second step. In the second step, the intake running water is cut off and replaced by the waste water in the reservoir. The waste water is recycled to get more pure water, until the water level in the reservoir goes below the lower limit (taking about 15 min.), where the first step will then be restarted again. Finally, the waste water remaining in the reservoir is drained out to be disposed of or for other purposes. Hence in this way, the waste water can be reduced to a minimum and achieve a high-purification ratio, for saving more water.

BRIEF DESCRIPTION OF THE DRAWINGS

FIG. 2 is a flow-process diagram showing a first step of operation of the present invention;

FIG. 3 is a flow-process diagram showing a second step of operation of the present invention;

FIG. 4 is a flow-process diagram showing a third step of operation of the present invention;

DETAILED DESCRIPTION OF PREFERRED EMBODIMENTS

Figure 1:
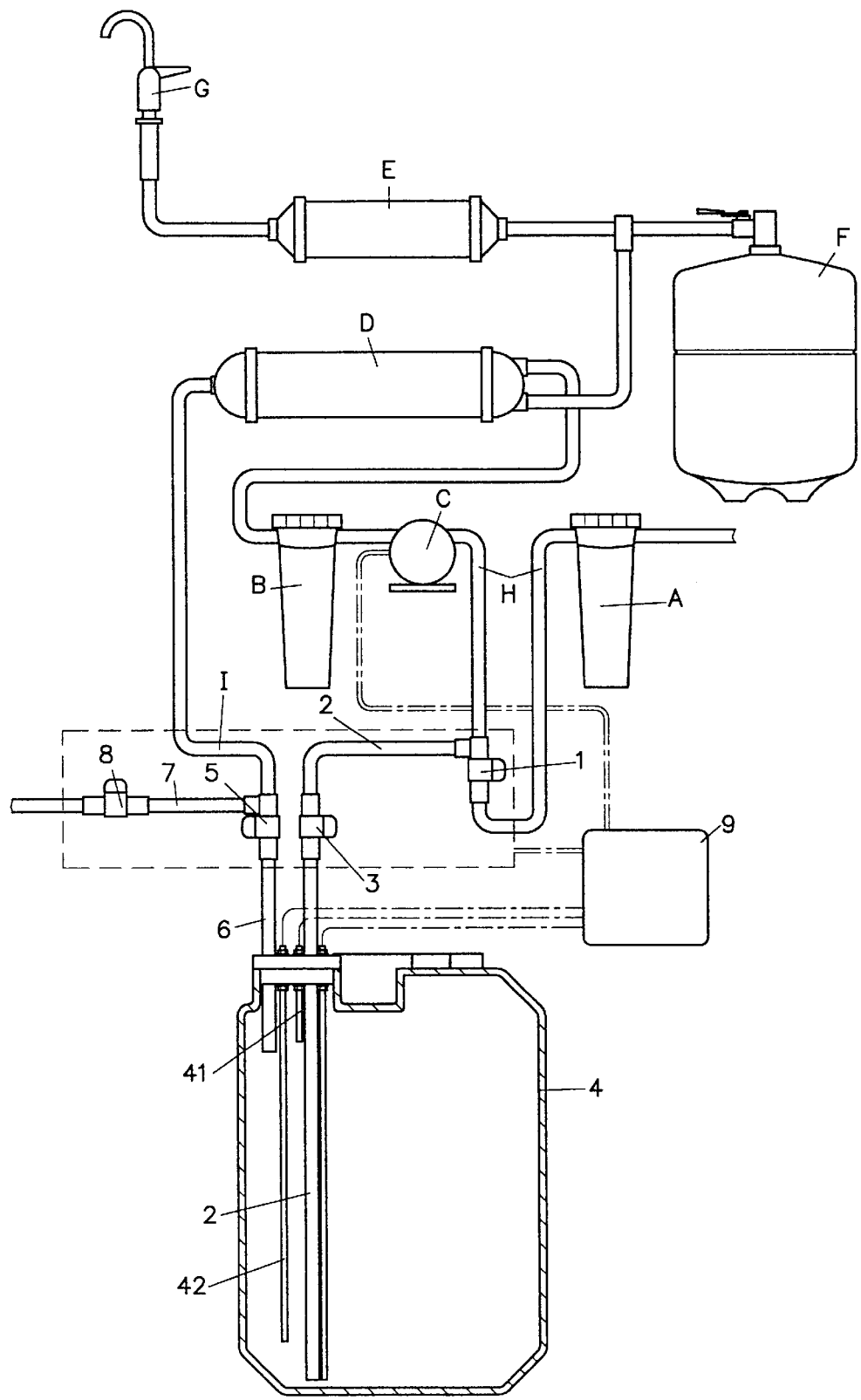
FIG. 1 is a structural schematic of the present invention.

Referring to FIG. 1, the present invention includes two cartridge filters A and B, a pump C, a reverse osmosis cylinder D, an activated carbon filter cylinder E, a water tank F and a faucet G. A pipe line connecting the reverse osmosis cylinder D, the two cartridge filters A and B, at a front segment thereof, and the pump C together in series functions as an intake pipe line H. At the rear end of the reverse osmosis cylinder D, a drain pipe I is coupled for leading the waste water out. A T-joint is connected to the intake pipe line H. Ahead of that junction point, a solenoid valve 1 is attached in the pipe line H, and one end of the T-joint connects to an aspirating pipe 2 through a solenoid valve 3. The rear segment of the aspirating pipe 2 extends into a reservoir 4. A T-joint and a solenoid 5 and an input pipe 6 are connected with the drain pipe I. The rear segment of the input pipe 6 also extends into the reservoir 4. Another solenoid valve 8 is attached in the drain pipe 7 after the T-joint and solenoid 5. The four solenoids 1, 3, 5 and 8 are controlled to respectively operate under control of a central processing unit 9, which also controls the pump C, to form a system.

In use, referring to FIG. 2, the first step is the input of fresh running water into the reverse osmosis cylinder D via the intake pipe line H, the original purification components, and the open solenoid valve 1. Meanwhile, the solenoid valve 3 connected to the aspirating pipe 2 is in a closed state. The raw input water is treated by passing through the purification components and the reverse osmosis cylinder D to flow into the water tank F (about ⅕ of input water), but ⅘ of the input water is treated as waste water and drained out from the drain pipe I. During this time, the solenoid valve 8 is in a closed state, the solenoid valve 5 is in an open state, so that the waste water is not drained from the system, but is directed into the reservoir 4 for recycling. Along with the purification processing, the waste water is drained into the reservoir 4 continuously. When the water level in the container reaches an upper limit, by contacting an upper water gauge finger 41, a signal is transmitted to the central processing unit 9 from the upper water gauge finger 41 to trigger the processing unit 9 to send control signals to the solenoid valves 1 and 3 so as to close the solenoid valve 1 to stop the input of raw water, and open the solenoid valve 3 to connect drain line I to the aspirating pipe 2, as shown in FIG. 3, to start into the second step, waste water repurification. During this process, the raw water is blocked from the system, the waste water in the reservoir 4 is pumped up via the aspirating pipe 2, by the pump C, to flow through the cartridge filter B and enter the reverse osmosis purification cylinder D so that secondary waste water is generated and drained into the reservoir 4 again. Because some water is purified, the secondary waste water is less than that which results from the first step. In this way, the waste water in the reservoir 4 is gradually reduced with each further cycle. When the water level in the reservoir 4 falls below a lower limit, established by a lower water gauge finger 42, the central processing unit 9 will control the whole system to restore the original first step as the solenoid valves 1 an 3 are returned to their original states, wherein the new raw water flows in again, and the primary waste water is ducted into the reservoir 4, to restart a new circulation. Undergoing this recirculation a certain number of times, the waste water remaining in the reservoir 4 will contain the impurity in high levels, so that it should be drained, and the last step will be started, as shown in FIG. 4. In this step the solenoid valves 1 and 5 respectively coupled to the intake pipe line H and input pie 6 are closed. Meanwhile the solenoid valves 3 and 8 respectively coupled to the aspirating pipe 2 and the drain pipe 7 are opened, so that the multiply recycled waste water is treated in one last purification cycle, for about 15 minutes, to pump out the waste water from the reservoir 4 until the waste water reaches the lower limit. The waste water flows out from the drain pipe 7. When the waste water level falls below the lower limit, a level that is lower than the bottom end of the lower water gauge finger 42, the central processing unit 9 will stop aspirating the waste water to prepare to restart the new cycle.

Figure 5:
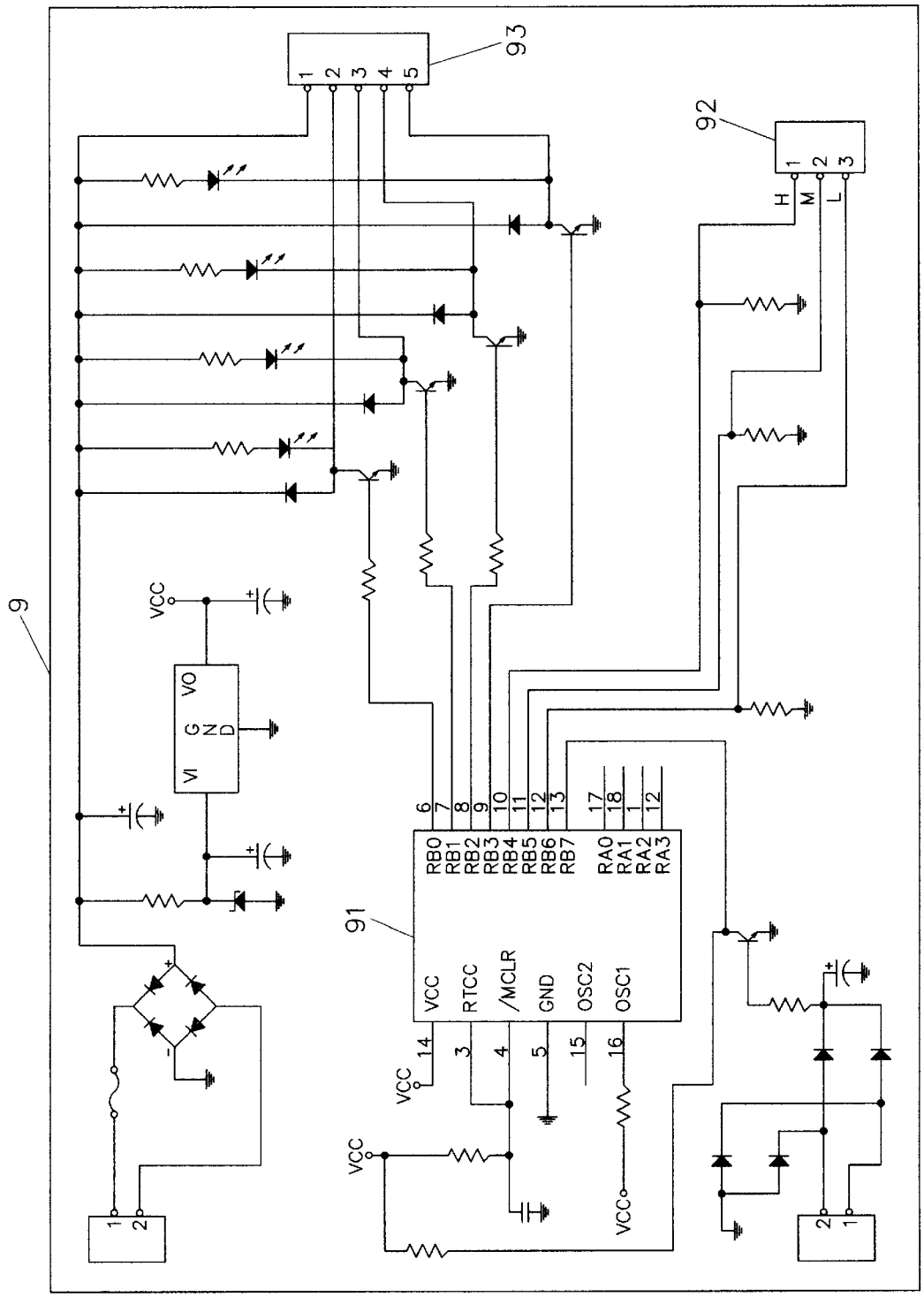
FIG. 5 is an electronic schematic diagram of the reverse osmosis water fountain machine.
Figure 6:
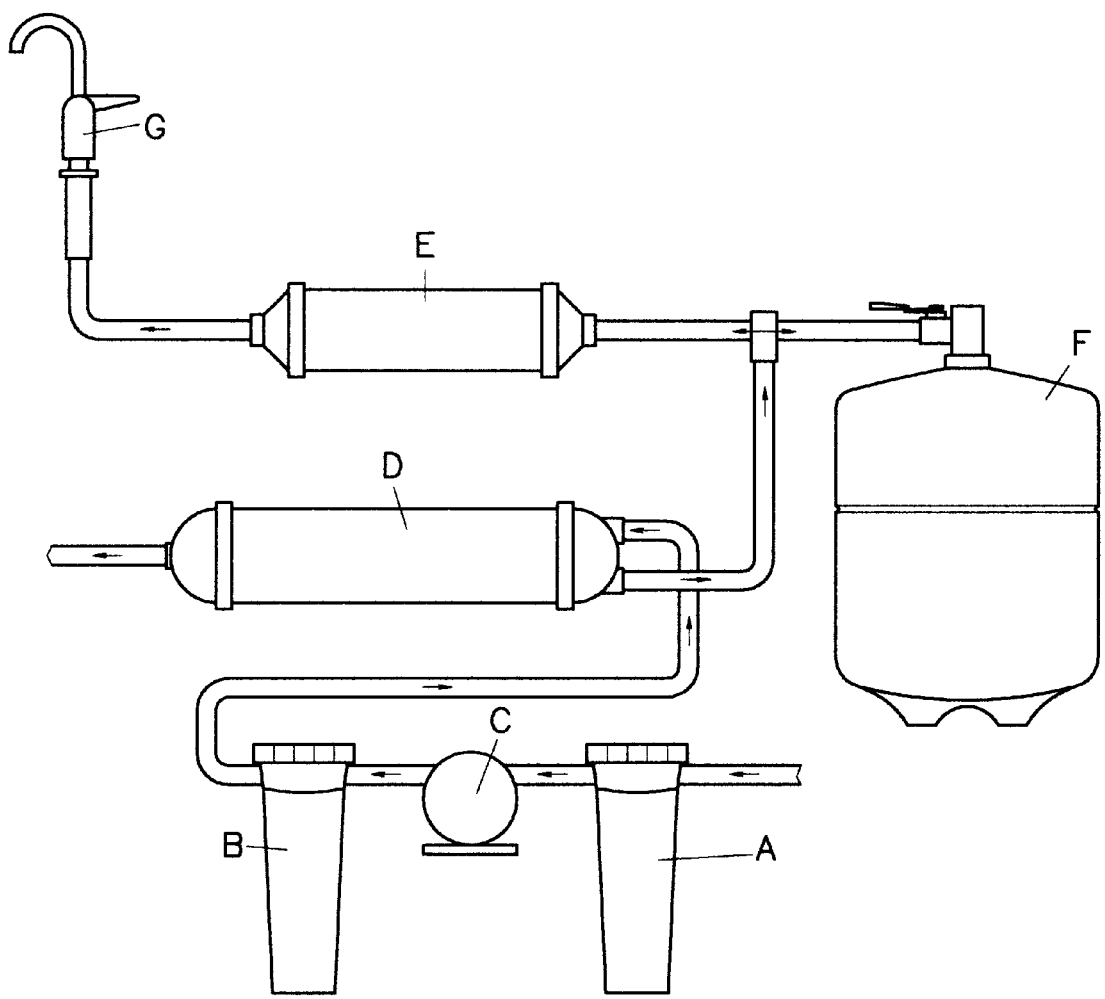
FIG. 6 is a structural scheme of a conventional reverse osmosis water fountain machine.

The central processing unit 9, as shown in FIG. 5, is a conventional unit which comprises a microprocessor 91, a water level detector connector 92 and an electromagnetic valve connector 93, wherein the water level detector connector 92 is connected respectively to the upper and the lower water gauge fingers 41 and 42, to transmit the detecting signals to the CPU 91. The electromagnetic valve connector 93 transfers the signals from the CPU 91 to the electromagnetic valve s 1, 3, 5 and 8 to control their operation.

I claim:

1. A water saving reverse osmosis water fountain machine, comprising:

a filtered input pipe coupled to a raw water source on a first end thereof;

a pump having an inlet coupled to a second end of said filtered input pipe;

a reverse osmosis cylinder having a filtered water inlet, a purified water outlet, and a waste water outlet, said filtered water inlet being coupled to an outlet of said pump;

a storage tank coupled to said purified water outlet of said reverse osmosis cylinder for storing purified water therein;

a faucet coupled to said storage tank for dispensing purified water from said storage tank;

a waste water reservoir having a waste water input pipe and an aspiration pipe;

a first solenoid valve coupled between said waste water outlet of said reverse osmosis cylinder and said waste water input pipe for controlling waste water flow into said waste water reservoir;

a drain pipe coupled to said waste water outlet of said reverse osmosis cylinder downstream of said first solenoid valve;

a second solenoid valve coupled to said drain pipe for controlling waste water flow therethrough;

a third solenoid valve coupled intermediate said first and second ends of said filtered input pipe for controlling raw water flow therethrough;

a fourth solenoid valve coupled on one end to said filtered input pipe between said third solenoid valve and said pump inlet, and on an opposing end coupled to said aspiration pipe for controlling flow of waste water from said waste water reservoir to said pump inlet;

a first liquid level sensor disposed in an upper portion of said waste water reservoir;

a second liquid level sensor disposed in a lower portion of said waste water reservoir; and, a central processing unit having a pair of inputs respectively coupled to said first and second liquid level sensors and respective outputs coupled to said first, second, third and fourth solenoid valves and said pump, said central processing unit closing said third solenoid valve and opening said fourth solenoid valve responsive to said first liquid level sensor detecting waste water at a first predetermined level to recirculate waste water through said reverse osmosis cylinder, said central processing unit closing said first solenoid valve and opening said second solenoid valve responsive to said second liquid level sensor detecting waste water at a second predetermined level to discharge waste water through said second solenoid valve.

* * * * *